United States Patent
Kobayashi et al.

(10) Patent No.: US 9,605,185 B2
(45) Date of Patent: Mar. 28, 2017

(54) PROPYLENE-BASED POLYMER AND HOT MELT ADHESIVE

(71) Applicant: IDEMITSU KOSAN CO., LTD., Chiyoda-ku (JP)

(72) Inventors: Kenji Kobayashi, Chiba (JP); Masao Inoue, Sodegaura (JP); Yutaka Minami, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 19 days.

(21) Appl. No.: 14/442,544

(22) PCT Filed: Nov. 12, 2013

(86) PCT No.: PCT/JP2013/080611
§ 371 (c)(1),
(2) Date: May 13, 2015

(87) PCT Pub. No.: WO2014/077258
PCT Pub. Date: May 22, 2014

(65) Prior Publication Data
US 2015/0284600 A1 Oct. 8, 2015

(30) Foreign Application Priority Data

Nov. 15, 2012 (JP) ................................ 2012-251522
Feb. 22, 2013 (JP) ................................ 2013-033908

(51) Int. Cl.
*C09J 123/00* (2006.01)
*C09J 123/08* (2006.01)
*C08F 110/06* (2006.01)

(52) U.S. Cl.
CPC ....... *C09J 123/0815* (2013.01); *C08F 110/06* (2013.01)

(58) Field of Classification Search
CPC .......................... C09J 123/0815; C08F 110/06
See application file for complete search history.

(56) References Cited

U.S. PATENT DOCUMENTS

| | | | |
|---|---|---|---|
| 2003/0017940 A1 | 1/2003 | Kashiwamura et al. | |
| 2004/0115456 A1 | 6/2004 | Kanderski et al. | |
| 2005/0159566 A1 | 7/2005 | Minami et al. | |
| 2010/0324242 A1 | 12/2010 | Machida et al. | |
| 2015/0368522 A1* | 12/2015 | Fujinami et al. | C08F 110/06 156/327 |
| 2016/0115360 A1* | 4/2016 | Hashima et al. | C09J 5/06 524/582 |

FOREIGN PATENT DOCUMENTS

| | | |
|---|---|---|
| JP | 8-60121 | 3/1996 |
| JP | 8-183941 | 7/1996 |
| JP | 2006-515693 A | 6/2006 |
| JP | 2008-285443 A | 11/2008 |
| JP | 2010-518235 A | 5/2010 |
| WO | 02/24714 A1 | 3/2002 |
| WO | 03/091289 A1 | 11/2003 |
| WO | 2008047860 A1 | 4/2008 |

OTHER PUBLICATIONS

International Search Report issued Feb. 10, 2014 in PCT/JP2013/080611 filed Nov. 12, 2013.

* cited by examiner

*Primary Examiner* — Nathan M Nutter
(74) *Attorney, Agent, or Firm* — Oblon, McClelland, Maier & Neustadt, L.L.P.

(57) ABSTRACT

A propylene-based polymer which satisfies the following (a1) to (d1): (a1) [mmmm]=60 to 80 mol %; (b1) weight-average molecular weight (Mw)=10,000 to 55,000; (c1) Mw/Mn≤2.5; and (d1) [rmrm]≤2.5 mol %.

15 Claims, No Drawings

PROPYLENE-BASED POLYMER AND HOT MELT ADHESIVE

TECHNICAL FIELD

The present invention relates to a propylene-based polymer, particularly relates to a propylene-based polymer, which can be applied as a modifier for a hot melt adhesive.

BACKGROUND ART

A hot melt adhesive is a solvent-free adhesive and has a characteristic that instant bonding and high-speed bonding can be achieved since adhesiveness is exhibited after the adhesive is melted by heating and coated onto an adherend, followed by cooling to solidify the adhesive, and therefore has been used in a wide range of fields. Not only adherends to be bonded with such a hot melt adhesive but also the conditions of use thereof are various. At present, various hot melt adhesives for use in various applications have been developed and supplied to the market. Also for the conditions of use, various operating temperatures ranging from low temperatures to high temperatures are considered, and recently, a hot melt adhesive having excellent heat resistance has been demanded. Further, in consideration of the wettability to a base material or the coatability onto a base material having a complicated shape, the hot melt adhesive is required to have an appropriate length of open time. Here, the "open time" refers to a tackiness retention time from when an adhesive is coated onto an adherend to when the temperature is decreased and the tackiness disappears, and from the viewpoint of the workability, it is preferred that the open time is longer. If the open time is too short, it is difficult to bond an adherend to a base material.

Thus, the development of a hot melt adhesive which is well balanced between heat resistance and a moderate open time and has a favorable coatability has been desired.

Conventionally, there has been known a hot melt adhesive obtained by blending a tackifier resin, a liquid plasticizer, and other additives in a copolymer rubber or the like (see, for example, PTL 1). However, a conventional hot melt adhesive has a problem that when the amount of a plasticizer, other additives or the like is increased to prolong the open time, the cohesive force is decreased, while on the other hand, when the amount of a tackifier resin or the like is increased to improve the cohesive force or the ability to maintain heat resistance, the flexibility is decreased.

Further, PTL 2 discloses a hot melt adhesive containing an ethylene-based copolymer as a base polymer and also containing a tackifier resin and a wax. This adhesive has high adhesive strength at low temperatures, but its open time is insufficient and its heat resistance, particularly heat creep resistance is poor as an adhesive.

PTL 3 discloses that in order to improve the heat resistance of a hot melt adhesive, a specific polymer (a functionalized metallocene polymer) is used as a base polymer. However, the hot melt adhesive described in PTL 3 is insufficient in the open time and does not fully satisfy the heat resistance requested by users.

CITATION LIST

Patent Literature

PTL 1: JP-A 8-60121
PTL 2: JP-A 8-183941
PTL 3: JP-T 2010-518235

SUMMARY OF INVENTION

Technical Problem

An object of the present invention is to provide a hot melt adhesive having a moderate open time and further to provide a hot melt adhesive which is well balanced between heat creep resistance and moderate open time.

Solution to Problem

According to the present invention, the following propylene-based polymer, hot melt adhesive, and bonding method are provided.

[1] A propylene-based polymer which satisfies the following (a1) to (d1):
   (a1) [mmmm]=60 to 80 mol %;
   (b1) weight-average molecular weight (Mw)=10,000 to 55,000;
   (c1) Mw/Mn≤2.5; and
   (d1) [rmrm]<2.5 mol %.
[2] The propylene-based polymer according to the above [1], wherein the following
   (b1') is satisfied:
   (b1') weight-average molecular weight (Mw)=10,000 to 51,000.
[3] A hot melt adhesive, containing the propylene-based polymer (B1) according to the above [1] or [2] in an amount of 1 to 30 parts by mass with respect to 100 parts by mass of an ethylene-based polymer (A).
[4] A hot melt adhesive, containing a propylene-based polymer (B2) which satisfies the following (a2) and (b2) in an amount of 1 to 30 parts by mass with respect to 100 parts by mass of an ethylene-based polymer (A):
   (a2) [mmmm]=20 to 80 mol %; and
   (b2) weight-average molecular weight (Mw)=1,000 to 150,000.
[5] The hot melt adhesive according to the above [3] or [4], wherein the ethylene-based polymer (A) is an ethylene-a-olefin copolymer.
[6] The hot melt adhesive according to any one of the above [3] to [5], wherein the ethylene-based polymer (A) is an ethylene-1-octene copolymer.
[7] The hot melt adhesive according to any one of the above [3] to [6], wherein the ethylene-based polymer (A) is an ethylene-1-octene copolymer containing 63 to 65% by mass of a structural unit derived from ethylene and 35 to 37% by mass of a structural unit derived from 1-octene.
[8] The hot melt adhesive according to any one of the above [3] to [7], further containing a tackifier resin (C) in an amount of 50 to 200 parts by mass and a wax (D) in an amount of 50 to 200 parts by mass with respect to 100 parts by mass of the ethylene-based polymer (A).
[9] A method for bonding a base material to another base material, including a step of melting the hot melt adhesive according to any one of the above [3] to [8] and coating the adhesive onto at least one base material, and a step of bonding the other base material to the coated hot melt adhesive.

Hereinafter, the propylene-based polymer according to the above [1] is referred to as "propylene-based polymer of the present invention". Further, the hot melt adhesive according to the above [3] is referred to as "hot melt adhesive of the first embodiment of the present invention", and the hot melt adhesive according to the above [4] is referred to as "hot melt adhesive of the second embodiment of the present invention". Further, a hot melt adhesive containing the propylene-based polymer according to the above [1] as a base polymer is referred to as "hot melt adhesive of the third embodiment of the present invention".

Advantageous Effects of Invention

The hot melt adhesive containing the propylene-based polymer of the present invention as a modifier has an excellent balance between favorable heat creep resistance and moderate open time. Further, the hot melt adhesive of the present invention has a moderate open time, and further has an excellent balance between favorable heat creep resistance and moderate open time.

DESCRIPTION OF EMBODIMENTS

[Propylene-based Polymer of the Present Invention]

The propylene-based polymer of the present invention satisfies the following (a1) to (d1), and preferably further satisfies the following (e1).

(a1) [mmmm]=60 to 80 mol %
(b1) weight-average molecular weight (Mw)=10,000 to 55,000
(c1) Mw/Mn≤2.5
(d1) [rmrm]<2.5 mol %
(e1) melting point (Tm-D)=0 to 140° C.

In the above formulae, [mmmm] represents a meso pentad fraction, and [rmrm] represents a racemic meso racemic meso pentad fraction.

The propylene-based polymer of the present invention is a propylene-based polymer containing a propylene unit as a main component, and is a propylene homopolymer or a copolymer in which the copolymerization ratio of a propylene unit is 50 mol % or more, preferably 70 mol % or more, more preferably 90 mol % or more. Further, the propylene-based polymer may be composed only of one propylene homopolymer, or may be a mixture of two or more propylene homopolymers having different molecular weights, stereoregularities, or the like.

Examples of a comonomer other than propylene in the propylene-based copolymer include ethylene and α-olefins having 4 or more carbon atoms (preferably α-olefins having 4 to 20 carbon atoms). Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene, and 1-eicosen. In the present invention, among these, one type or two or more types can be used.

In the present invention, the meso pentad fraction [mmmm] and the racemic meso racemic meso pentad fraction [rmrm] are determined in accordance with the method proposed in "Macromolecules, 6, 925 (1973)" by A. Zambelli et al, and are a meso fraction and a racemic meso racemic meso fraction in a pentad unit in a polypropylene molecular chain measured with the signal of a methyl group in the $^{13}$C-NMR spectrum.

The measurement of the $^{13}$C-NMR spectrum was carried out using the following device under the following conditions.

Device: $^{13}$C-NMR spectrometer, JNM-EX400 series manufactured by JEOL, Ltd.
Method: proton complete decoupling method
Concentration: 220 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times <Calculation Formulae>
M=m/S×100
R=γ/S×100
S=Pββ+Paβ+Paγ
S: signal strength of side-chain methyl carbon atom in all propylene units
Pββ: 19.8 to 22.5 ppm
Paβ: 18.0 to 17.5 ppm
Paγ: 17.5 to 17.1 ppm
γ: racemic pentad chain: 20.7 to 20.3 ppm
m: meso pentad chain: 21.7 to 22.5 ppm Further, in the present invention, the weight-average molecular weight (Mw) and the number-average molecular weight (Mn) are a weight-average molecular weight and a number-average molecular weight in terms of polystyrene measured using the following device under the following conditions. The molecular weight distribution (Mw/Mn) is a value calculated from the weight-average molecular weight (Mw) and the number-average molecular weight (Mn).

<GPC Measuring Device>
Column: TOSO GMHHR-H(S)HT
Detector: RI detector for liquid chromatography, Waters 150C <Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)

(a1) Meso Pentad Fraction [mmmm]

The meso pentad fraction [mmmm] of the propylene-based polymer of the present invention is from 60 to 80 mol %. When the [mmmm] is 60 mol % or more, the cohesive force and the heat creep resistance are excellent. Further, when the [mmmm] is 80 mol % or less, favorable wettability to an adherend is exhibited. From this point of view, the meso pentad fraction [mmmm] is preferably more than 60 mol % and 80 mol % or less, more preferably more than 60 mol % and 75 mol % or less, further more preferably more than 60 mol % and 72 mol % or less. The meso pentad fraction can be controlled by adjusting the monomer concentration or the reaction pressure.

(b1) Weight-Average Molecular Weight (Mw)

The weight-average molecular weight of the propylene-based polymer of the present invention is from 10,000 to 55,000. When the weight-average molecular weight is 10,000 or more, the cohesive force and the heat creep resistance are strong. Further, when the weight-average molecular weight is 55,000 or less, the viscosity is appropriate and the coatability is favorable. From this point of view, the weight-average molecular weight is preferably from 10,000 to 51,000, more preferably from 15,000 to 40,000, further more preferably from 15,000 to 37,000. The weight-average molecular weight can be controlled by appropriately adjusting the polymerization conditions (such as propylene pressure and polymerization time).

(c1) Molecular Weight Distribution (Mw/Mn)

The molecular weight distribution (Mw/Mn) of the propylene-based polymer of the present invention is 2.5 or less. When the molecular weight distribution is 2.5 or less, the coatability is excellent. From this point of view, the molecular weight distribution is preferably 2.4 or less, more preferably 2.2 or less. The molecular weight distribution (Mw/Mn) can be set to 2.5 or less by using a metallocene-based catalyst.

(d1) Racemic Meso Racemic Meso Fraction [rmrm]

The racemic meso racemic meso fraction [rmrm] of the propylene-based polymer of the present invention is less than 2.5 mol %. When the [rmrm] is less than 2.5 mol %, a favorable cohesive force is exhibited. From this point of view, the racemic meso racemic meso fraction [rmrm] is preferably less than 2.4 mol %, more preferably less than 2.2 mol %. The [rmrm] can be controlled by appropriately changing the catalyst using the metallocene catalyst as described herein.

(e1) Melting Point (Tm-D)

The melting point (Tm-D) of the propylene-based polymer of the present invention is preferably from 0 to 140° C., more preferably from 20 to 120° C., further more preferably from 90 to 120° C. from the viewpoint of the improvement of the open time and also the improvement of the heat creep resistance.

In the present invention, the top of a peak observed on the highest temperature side in a melting endothermic curve obtained by using a differential scanning calorimeter (manufactured by PerkinElmer Co., Ltd., DSC-7), and keeping 10 mg of a sample in a nitrogen atmosphere at −10° C. for 5 minutes, and then raising the temperature at 10° C./min is defined as the melting point (Tm-D). The melting point can be controlled by adjusting the monomer concentration or the reaction pressure.

(Production Method for Propylene-Based Polymer of the Present Invention)

Examples of the production method for the propylene-based polymer of the present invention include a production method for a propylene homopolymer by homopolymerization of propylene using a metallocene catalyst and a production method for a propylene copolymer by copolymerization of propylene and ethylene and/or an α-olefin having 4 or more carbon atoms using a metallocene catalyst.

Examples of the metallocene-based catalyst include catalysts obtained by combining a transition metal compound containing one or two ligands selected from a cyclopentadienyl group, a substituted cyclopentadienyl group, an indenyl group, a substituted indenyl group, and the like as described in JP-A 58-19309, JP-A 61-130314, JP-A 3-163088, JP-A 4-300887, JP-A 4-211694, JP-T 1-502036, and the like, or a transition metal compound, in which the above ligand is geometrically controlled, with a promoter.

In the present invention, among the metallocene catalysts, a case where a catalyst is composed of a transition metal compound in which a ligand forms a crosslinked structure through a crosslinking group is preferred, and above all, a method using a metallocene catalyst obtained by combining a transition metal compound, in which a crosslinked structure is formed through two crosslinking groups, with a promoter is more preferred.

Specific examples of the method include a method of homopolymerizing propylene and a method of copolymerizing propylene and ethylene and/or an α-olefin having 4 or more carbon atoms, wherein the homopolymerization or the copolymerization is carried out in the presence of a polymerization catalyst containing (A) a transition metal compound represented by the general formula (I), and (B) a component selected from (B-1) a compound capable of reacting with the transition metal compound as the component (A) or a derivative thereof to form an ionic complex and (B-2) an aluminoxane.

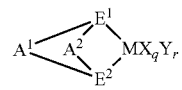

[In the formula, M represents a metal element of Groups 3 to 10 of the Periodic Table or a metal element of the lanthanoid series. $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and further, $E^1$ and $E^2$ may be the same as or different from each other. X represents a σ-bonding ligand, and when plural X's are present, plural X's may be the same as or different from each other and may be crosslinked with any other X, $E^1$, $E^2$, or Y. Y represents a Lewis base, and when plural Y's are present, plural Y's may be the same as or different from each other and may be crosslinked with any other Y, $E^1$, $E^2$, or X. $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$, or —AlR$^1$-, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other. q is an integer of 1 to 5 and represents [(the valence of M)−2], and r represents an integer of 0 to 3].

In the above general formula (I), M represents a metal element of Groups 3 to 10 of the Periodic Table or a metal element of the lanthanoid series, and specific examples thereof include titanium, zirconium, hafnium, yttrium, vanadium, chromium, manganese, nickel, cobalt, palladium, and lanthanoid series metals. Among these, from the viewpoint of the olefin polymerization activity or the like, metal elements of Group 4 of the Periodic Table are preferred, and particularly, titanium, zirconium, and hafnium are preferred.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<], and a silicon-containing group [>SiR-, >Si<] (wherein R is hydrogen or a hydrocarbon group having 1 to 20 carbon atoms or a heteroatom-containing group), and form a crosslinked structure through $A^1$ and $A^2$. $E^1$ and $E^2$ may be the same as or different from each other. As $E^1$ and $E^2$, a substituted cyclopentadienyl group, an indenyl group, and a substituted indenyl group are preferred. Examples of the substituent include a hydrocarbon group having 1 to 20 carbon atoms and a silicon-containing group.

Further, X represents a σ-bonding ligand, and in the case where plural X's are present, plural X's may be the same as or different from each other and may be crosslinked with any other X, $E^1$, $E^2$, or Y. Specific examples of this X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, and an acyl group having 1 to 20 carbon atoms.

Examples of the halogen atom include a chlorine atom, a fluorine atom, a bromine atom, and an iodine atom. Specific examples of the hydrocarbon group having 1 to 20 carbon atoms include an alkyl group such as a methyl group, an ethyl group, a propyl group, a butyl group, a hexyl group, a cyclohexyl group, and an octyl group; an alkenyl group such as a vinyl group, a propenyl group, and a cyclohexenyl group; an arylalkyl group such as a benzyl group, a phenylethyl group, and a phenylpropyl group; and an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group. Above all, an alkyl group such as a methyl group, an ethyl group, and a propyl group; and an aryl group such as a phenyl group are preferred.

Examples of the alkoxy group having 1 to 20 carbon atoms include an alkoxy group such as a methoxy group, an ethoxy group, a propoxy group, and a butoxy group; a phenylmethoxy group, and a phenylethoxy group. Examples of the aryloxy group having 6 to 20 carbon atoms include a phenoxy group, a methylphenoxy group, and a dimethylphenoxy group. Examples of the amide group having 1 to 20 carbon atoms include an alkylamide group such as a dimethylamide group, a diethylamide group, a dipropylamide group, a dibutylamide group, a dicyclohexylamide group, and a methylethylamide group; an alkenylamide group such as a divinylamide group, a dipropenylamide group, and a dicyclohexenylamide group; an arylalkylamide group such as a dibenzylamide group, a phenylethylamide group, and a phenylpropylamide group; and an arylamide group such as a diphenylamide group and a dinaphthylamide group.

Examples of the silicon-containing group having 1 to 20 carbon atoms include a mono-hydrocarbon-substituted silyl group such as a methylsilyl group and a phenylsilyl group; a dihydrocarbon-substituted silyl group such as a dimethylsilyl group and a diphenylsilyl group; a trihydrocarbon-substituted silyl group such as a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group, and a trinaphthylsilyl group; a hydrocarbon-substituted silyl ether group such as a trimethylsilyl ether group; a silicon-substituted alkyl group such as a trimethylsilylmethyl group; and a silicon-substituted aryl group such as a trimethylsilylphenyl group. Above all, a trimethylsilylmethyl group, a phenyldimethylsilylethyl group, and the like are preferred.

Examples of the phosphide group having 1 to 20 carbon atoms include an alkyl sulfide group such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group such as a vinyl sulfide group, a propenyl sulfide group, and a cyclohexenyl sulfide group; an arylalkyl sulfide group such as a benzyl sulfide group, a phenylethyl sulfide group, and a phenylpropyl sulfide group; and an aryl sulfide group such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the sulfide group having 1 to 20 carbon atoms include an alkyl sulfide group such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group such as a vinyl sulfide group, a propenyl sulfide group, and a cyclohexenyl sulfide group; an arylalkyl sulfide group such as a benzyl sulfide group, a phenylethyl sulfide group, and a phenylpropyl sulfide group; and an aryl sulfide group such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the acyl group having 1 to 20 carbon atoms include a formyl group; an alkylacyl group such as an acetyl group, a propionyl group, a butyryl group, a valeryl group, a palmitoyl group, a stearoyl group, and an oleoyl group; an arylacyl group such as a benzoyl group, a toluoyl group, a salicyloyl group, a cinnamoyl group, a naphthoyl group, and a phthaloyl group; and an oxalyl group, a malonyl group, and a succinyl group, which are derived from oxalic acid, malonic acid, and succinic acid, each being a dicarboxylic acid, respectively.

On the other hand, Y represents a Lewis base, and in the case where plural Y's are present, plural Y's may be the same as or different from each other and may be crosslinked with any other Y, $E^1$, $E^2$, or X. Specific examples of the Lewis base represented by Y include amines, ethers, phosphines, and thioethers.

Examples of the amines include amines having 1 to 20 carbon atoms, and specific examples thereof include alkylamines such as methylamine, ethylamine, propylamine, butylamine, cyclohexylamine, methylethylamine, dimethylamine, diethylamine, dipropylamine, dibutylamine, dicyclohexylamine, and methylethylamine; alkenylamines such as vinylamine, propenylamine, cyclohexenylamine, divinylamine, dipropenylamine, and dicyclohexenylamine; arylalkylamines such as phenylamine, phenylethylamine, and phenylpropylamine; and arylamines such as diphenylamine and dinaphthylamine.

Examples of the ethers include aliphatic monoether compounds such as methyl ether, ethyl ether, propyl ether, isopropyl ether, butyl ether, isobutyl ether, n-amyl ether, and isoamyl ether; aliphatic mixed ether compounds such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds such as vinyl ether, allyl ether, methylvinyl ether, methylallyl ether, ethylvinyl ether, and ethylallyl ether; aromatic ether compounds such as anisole, phenetole, phenyl ether, benzyl ether, phenylbenzyl ether, a-naphthyl ether, and β-naphthyl ether; and cyclic ether compounds such as ethylene oxide, propylene oxide, trimethylene oxide, tetrahydrofuran, tetrahydropyran, and dioxane.

Examples of the phosphines include phosphines having 1 to 20 carbon atoms. Specific examples thereof include alkyl phosphines including monohydrocarbon-substituted phosphines such as methyl phosphine, ethyl phosphine, propyl phosphine, butyl phosphine, hexyl phosphine, cyclohexyl phosphine, and octyl phosphine; dihydropcarbon-substituted phosphines such as dimethyl phosphine, diethyl phosphine, dipropyl phosphine, dibutyl phosphine, dihexyl phosphine, dicyclohexyl phosphine, and dioctyl phosphine; trihydrocarbon-substituted phosphines such as trimethyl phosphine, triethyl phosphine, tripropyl phosphine, tributyl phosphine, trihexyl phosphine, tricyclohexyl phosphine, and trioctyl phosphine; monoalkenyl phosphines such as vinyl phosphine, propenyl phosphine, and cyclohexenyl phosphine; dialkenyl phosphines in which two hydrogen atoms of phosphine are each substituted with alkenyl; trialkenyl phosphines in which three hydrogen atoms of phosphine are each substituted with alkenyl; and arylphosphines including arylalkyl phosphines such as benzyl phosphine, phenylethyl phosphine, and phenylpropyl phosphine; diarylalkyl phosphines or aryldialkyl phosphines in which three hydrogen atoms of phosphine are each substituted with aryl or alkenyl; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthryl phosphine; di(alkylaryl)phosphines in which two hydrogen atoms of phosphine are each substituted with alkylaryl; and tri(alkylaryl)phosphines in which three hydrogen atoms of phosphine are each substituted with alkylaryl. Examples of the thioethers include the above-mentioned sulfides.

Next, $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$-, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other. Examples of such a crosslinking group include a group represented by the following general formula (II).

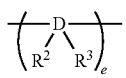
(II)

(D is carbon, silicon, or tin. $R^2$ and $R^3$ are each a hydrogen atom or a hydrocarbon group having 1 to 20 carbon atoms, and may be the same as or different from each other, or may be bonded to each other to form a ring structure. e represents an integer of 1 to 4.)

Specific examples thereof include a methylene group, an ethylene group, an ethylidene group, a propylidene group, an isopropylidene group, a cyclohexylidene group, a 1,2-cyclohexylene group, a vinylidene (CH$_2$=C=) group, a dimethylsilylene group, a diphenylsilylene group, a methylphenylsilylene group, a dimethylgermylene group, a dimethylstannylene group, a tetramethyldisilylene group, and a diphenyldisilylene group. Among these, an ethylene group, an isopropylidene group, and a dimethylsilylene group are preferred.

q is an integer of 1 to 5 and represents [(the valence of M)−2], and r represents an integer of 0 to 3.

Specific examples of the transition metal compound represented by the general formula (I) include the specific examples described in WO 02/16450 as preferred examples also in the present invention. More preferred specific examples thereof include (1,2'-dimethylsilylene)(2,1'-dimethylsilylene)bis(indenyl)zirconium dichloride, (1,2'-dimethylsilylene)(2,1'-dimethylsilylene)(indenyl)(3-trimethylsilylmethylindenyl)zirconium dichloride, and (1,2'-dimethylsilylene)(2,1'-dimethylsilylene)bis(3-trimethylsilylmethyl-indenyl)zirconium dichloride.

Next, any compound can be used as the component (B-1) in the components (B) as long as it is a compound which can be reacted with the transition metal compound as the component (A) described above to form an ionic complex, however, a compound represented by the following general formula (III) or (IV) can be preferably used:

(III)

(IV)

wherein, $L^2$ is $M^2$, $R^{11}R^{12}M^3$, $R^{13}{}_3C$, or $R^{14}M^3$.

In the above general formulae (III) and (IV), $L^1$ represents a Lewis base, [Z] represents a non-coordinating anion $[Z^1]^-$ or $[Z^2]^-$.

$[Z^1]^-$ represents an anion in which plural groups are bonded to an element, that is, $[M^1G^1G^2 \ldots G^f]^-$. Here, $M^1$ represents an element of Groups 5 to 15 of the Periodic Table, preferably an element of Groups 13 to 15 of the Periodic Table. $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more groups of $G^1$ to $G^f$ may form a ring. f represents an integer of [(the valence of the central metal $M^1$)+1]).

$[Z^2]^-$ represents a conjugate base of a Bronsted acid alone in which the logarithm (pKa) of an inverse number of an acid dissociation constant is −10 or less or a combination of a Bronsted acid and a Lewis acid, or a conjugate base of an acid generally defined as an ultrastrong acid. Further, a Lewis base may be coordinated.

$R^{10}$ represents a hydrogen atom, an alkyl group having 1 to 20 carbon atoms, an aryl group having 6 to 20 carbon atoms, an alkylaryl group, or an arylalkyl group.

$R^{11}$ and $R^{12}$ each represent a cyclopentadienyl group, a substituted cyclopentadienyl group, an indenyl group, or a fluorenyl group.

$R^{13}$ represents an alkyl group having 1 to 20 carbon atoms, an aryl group, an alkylaryl group, or an arylalkyl group.

$R^{14}$ represents a large cyclic ligand such as tetraphenylporphyrin or phthalocyanine. k is the ionic valence of each of $[L^1-R^{10}]$ and $[L^2]$, and represents an integer of 1 to 3, a represents an integer of 1 or more, and b is (k×a). $M^2$ includes an element of Groups 1 to 3, 11 to 13, and 17 of the Periodic Table, and $M^3$ represents an element of Groups 7 to 12 of the Periodic Table.

Here, specific examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, and p-nitro-N,N-dimethylaniline, phosphines such as triethylphosphine, triphenylphosphine, and diphenylphosphine, thioethers such as tetrahydrothiophene, esters such as ethyl benzoate, and nitriles such as acetonitrile and benzonitrile.

Specific examples of $R^{10}$ include hydrogen, a methyl group, an ethyl group, a benzyl group, and a trityl group. Specific examples of $R^{11}$ and $R^{12}$ include a cyclopentadienyl group, a methylcyclopentadienyl group, an ethylcyclopentadienyl group, and a pentamethylcyclopentadienyl group. Specific examples of $R^{13}$ include a phenyl group, a p-tolyl group, and a p-methoxyphenyl group. Specific examples of $R^{14}$ include teteraphenylporphine, phthalocyanine, allyl, and metallyl. Specific examples of $M^2$ include Li, Na, K, Ag, Cu, Br, I, and $I_3$. Specific examples of $M^3$ include Mn, Fe, Co, Ni, and Zn.

Further, in $[Z^1]^-$, that is, $[M^1G^1G^2 \ldots G^f]$, specific examples of $M^1$ include B, Al, Si, P, As, and Sb, and preferred examples thereof include B and Al. Specific examples of $G^1$, $G^2$ to $G^f$ include a dialkylamino group such as a dimethylamino group and a diethylamino group, an alkoxy group or an aryloxy group such as a methoxy group, an ethoxy group, an n-butoxy group, and a phenoxy group, a hydrocarbon group such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butyl-phenyl group, and a 3,5-dimethylphenyl group, a halogen atom such as fluorine, chlorine, bromine, and iodine, a heteroatom-containing hydrocarbon group such as a p-fluo-rophenyl group, a 3,5-difluorophenyl group, a pentachloro-phenyl group, a 3,4,5-trifluorophenyl group, a pentafluoro-phenyl group, a 3,5-bis(trifluoromethyl)phenyl group, and a bis(trimethylsilyl)methyl group, and an organic metalloid group such as a pentamethylantimony group, a trimethylsilyl group, a trimethylgermyl group, a diphenylarsine group, a dicyclohexylantimony group, and diphenylboron.

Also, specific examples of the non-coordinating anion, that is, the conjugate base $[Z^2]^-$ of a Bronsted acid alone having a pKa of −10 or less or a combination of a Bronsted acid with a Lewis acid include a trifluoromethanesulfonic acid anion $(CF_3SO_3)$, a bis(trifluoromethanesulfonyl)methyl anion, a bis(trifluoromethanesulfonyl)benzyl anion, bis(tri-fluoromethanesulfonyl)amide, a perchloric acid anion $(ClO_4)^-$, a trifluoroacetic acid anion $(CF_3CO_2)^-$, a hexafluo-roantimony anion $(SbF_6)^-$, a fluorosulfonic acid anion $(FSO_3)^-$, a chlorosulfonic acid anion $(ClSO_3)^-$, a fluorosul-fonic acid anion/an antimony pentafluoride $(FSO_3/SbF_5)^-$, a fluorosulfonic acid anion/arsenic pentafluoride $(FSO_3/AsF_5)^-$, and trifluoromethanesulfonic acid/antimony penta-fluoride $(CF_3SO_3/SbF_5)^-$.

Specific examples of the ionic compound which is reacted with the transition metal compound as the component (A) described above to form an ionic complex, that is, the compound as the component (B-1) include triethylammo-nium tetraphenylborate, tri-n-buthylammonium tetraphenyl-borate, trimethylammonium tetraphenylborate, tetraethyl-ammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphe-nylborate, trimethylanilinium tetraphenylborate, methyl-pyridinium tetraphenylborate, benzylpyridinium tetraphe-nylborate, methyl(2-cyanopyridinium)tetraphenylborate, triethylammonium tetrakis(pentafluoro-phenyl)borate, tri-n-butylammonium tetrakis(pentafluorophenyl)borate, triph-enylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methyldiphenylammonium tetrakis(pentafluorophe-nyl)-borate, triphenyl(methyl)ammonium tetrakis(penta-fluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)-borate, triphenylphosphonium tetrakis(pentafluorophenyl)borate, dimethylanilinium tetrakis[bis(3,5-ditrifluoromethyl)phe-nyl]borate, ferrocenium tetraphenylborate, silver tetraphe-nylborate, triethyl tetraphenylborate, tetraphenylporphyrin-manganese tetraphenylborate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis(pentafluo-rophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, and silver trifluorometh-anesulfonate.

As (B-1), one type may be used or two or more types may be used in combination.

On the other hand, examples of the aluminoxane as the component (B-2) include a chain aluminoxane represented by the general formula (V):

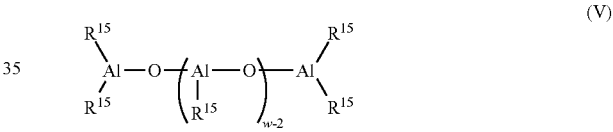

wherein $R^{15}$ represents a hydrocarbon group such as an alkyl group having 1 to 20 carbon atoms, preferably 1 to 12 carbon atoms, an alkenyl group, an aryl group, or an arylalkyl group or a halogen atom; and w represents an average polymer-ization degree and is an integer of usually 2 to 50, preferably 2 to 40, provided that the respective $R^{15}$'s may be the same as or different from each other) and, a cyclic aluminoxane represented by the general formula (VI):

wherein $R^{15}$ and w are the same as those in the above general formula (V).

Examples of the production method for the aluminoxane described above include a method in which alkylaluminum is brought into contact with a condensing agent such as water, but a means thereof is not particularly limited, and they may be reacted according to a known method. Examples of the method include (i) a method in which an organic aluminum compound is dissolved in an organic solvent, and then the resulting solution is brought into contact with water, (ii) a method in which an organic aluminum compound is first added when carrying out polymerization, and then water is added thereto, (iii) a method in which an organic aluminum compound is reacted with crystal water contained in a metal salt or the like, or water adsorbed on an inorganic substance or an organic substance, and (iv) a method in which trialkylaluminum is reacted with tetraalkyldialuminoxane and the reaction product is further reacted with water. The aluminoxane may be an aluminoxane which is insoluble in toluene.

Among these aluminoxanes, one type may be used or two or more types may be used in combination.

The use proportion of the catalyst component (A) to the catalyst component (B) is in the range of preferably 10:1 to 1:100, more preferably 2:1 to 1:10 in terms of molar ratio when the compound (B-1) is used as the catalyst component (B), and when it deviates from the above range, the catalyst cost per unit mass of the polymer increases, so that it is not practical. When the compound (B-2) is used, the use proportion is in the range of preferably 1:1 to 1:1,000,000, more preferably 1:10 to 1:10,000 in terms of molar ratio. When it deviates from the above range, the catalyst cost per unit mass of the polymer increases, so that it is not practical. Further, as the catalyst component (B), (B-1) and (B-2) can be used alone or two or more types can be used in combination.

In the polymerization catalyst in the above production method, an organic aluminum compound as a component (C) can be used in addition to the component (A) and the component (B) described above.

Here, as the organic aluminum compound serving as the component (C), a compound represented by the general formula (VII) is used:

$$R^{16}{}_{v}AlJ_{3-v} \qquad (VII)$$

wherein, $R^{16}$ represents an alkyl group having 1 to 10 carbon atoms, J represents a hydrogen atom, an alkoxy group having 1 to 20 carbon atoms, an aryl group having 6 to 20 carbon atoms, or a halogen atom, and v is an integer of 1 to 3.

Specific examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

Among these organic aluminum compounds, one type may be used or two or more types may be used in combination.

In the production method, preliminary contact can also be carried out using the component (A), the component (B), and the component (C) described above. The preliminary contact can be carried out by, for example, bringing the component (B) into contact with the component (A), but the method is not particularly limited, and a known method can be used. This preliminary contact is effective in the reduction in the catalyst cost due to the improvement of the catalyst activity, the reduction in the use proportion of the component (B) which is a promoter. Further, by bringing the component (A) into contact with the component (B-2), an effect of improving the molecular weight can be seen in addition to the effect described above. The preliminary contact temperature is usually −20° C. to 200° C., preferably −10° C. to 150° C., more preferably 0° C. to 80° C. In the preliminary contact, an aliphatic hydrocarbon, an aromatic hydrocarbon, or the like can be used as an inert hydrocarbon serving as a solvent. Among these, an aliphatic hydrocarbon is particularly preferred.

The use proportion of the catalyst component (A) to the catalyst component (C) is in the range of preferably 1:1 to 1:10,000, more preferably 1:5 to 1:2,000, further more preferably 1:10 to 1:1,000 in terms of molar ratio. By using the catalyst component (C), the polymerization activity per transition metal can be improved, however, if the amount thereof is too much, the organic aluminum compound is not only wasted, but also remains in a large amount in the polymer, and therefore the excessive amount thereof is not preferred.

In the present invention, at least one of the catalyst components can be carried on a suitable carrier and used. The type of the carrier is not particularly limited, and any of an inorganic oxide carrier, an inorganic carrier other than the inorganic oxide carrier, and an organic carrier can be used. However, in particular, an inorganic oxide carrier or an inorganic carrier other than the inorganic oxide carrier is preferred.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$, and mixtures thereof such as silica alumina, zeolite, ferrite, and glass fiber. Among these, $SiO_2$ and $Al_2O_3$ are particularly preferred. The inorganic oxide carrier described above may contain a small amount of a carbonate, a nitrate, a sulfate, or the like.

On the other hand, examples of the carrier other than the inorganic oxide carrier described above include magnesium compounds represented by the general formula: $MgR^{17}{}_{x}X^{1}{}_{y}$ typified by $MgCl_2$, $Mg(OC_2H_5)_2$, and the like, and complex salts thereof. Here, $R^{17}$ represents an alkyl group having 1 to 20 carbon atoms, an alkoxy group having 1 to 20 carbon atoms, or an aryl group having 6 to 20 carbon atoms, $X^1$ represents a halogen atom or an alkyl group having 1 to 20 carbon atoms, x is 0 to 2, y is 0 to 2, and x+y=2. The respective $R^{17}$s or the respective $X^1$s may be the same as or different from each other.

Further, examples of the organic carrier include polymers such as polystyrene, styrene-divinylbenzene copolymers, polyethylene, poly(1-butene), substituted polystyrene, and polyallylate, as well as starch and carbon.

As the carrier to be used in the production method described above, $MgCl_2$, $MgCl(OC_2H_5)$, $Mg(OC_2H_5)_2$, $SiO_2$, $Al_2O_3$, and the like are preferred. The properties of the carrier vary depending on the type thereof and the production method, however, the average particle diameter is usually from 1 to 300 μm, preferably from 10 to 200 μm, more preferably from 20 to 100 μm.

If the particle diameter is small, a fine powder in the polymer increases, and if the particle diameter is large, a coarse particle in the polymer increases to cause a reduction in the bulk density or the clogging of a hopper.

The carrier has a specific surface area of usually 1 to 1,000 $m^2/g$, preferably 50 to 500 $m^2/g$, and a pore volume of usually 0.1 to 5 $cm^3/g$, preferably 0.3 to 3 $cm^3/g$.

If either of the specific surface area and the pore volume deviates from the above range, the catalyst activity decreases in some cases. The specific surface area and the pore volume can be determined from the volume of adsorbed nitrogen gas according to, for example, a BET method.

Further, in the case where the carrier is an inorganic oxide carrier, the carrier is preferably used after it is fired at usually 150 to 1,000° C., preferably 200 to 800° C.

In the case where at least one of the catalyst components is carried on the carrier described above, it is desired to carry at least one of the catalyst component (A) and the catalyst component (B), preferably both of the catalyst component (A) and the catalyst component (B) on the carrier.

The method for carrying at least one of the component (A) and the component (B) on the carrier is not particularly limited, however, for example, (i) a method in which at least one of the component (A) and the component (B) is mixed with the carrier, (ii) a method in which the carrier is treated with an organic aluminum compound or a halogen-containing silicon compound, and then at least one of the component (A) and the component (B) is mixed therewith in an inert solvent, (iii) a method in which the carrier, the component (A) and/or the component (B), and an organic aluminum compound or a halogen-containing silicon compound are reacted with one another, (iv) a method in which the component (A) or the component (B) is carried on the carrier, and then the component (B) or the component (A) is mixed therewith, (v) a method in which a catalytic reaction product of the component (A) and the component (B) is mixed with the carrier, (vi) a method in which the carrier is allowed to coexist in the catalytic reaction of the component (A) and the component (B), or the like can be used.

In the reactions in the above (iv), (v), and (vi), it is also possible to add the organic aluminum compound as the component (C).

In the present invention, the catalyst may be prepared by irradiating an elastic wave when the components (A), (B), and (C) described above are brought into contact. As the elastic wave, generally a sonic wave, particularly preferably an ultrasonic wave can be used. To be specific, an ultrasonic wave with a frequency of 1 to 1,000 kHz, preferably an ultrasonic wave with a frequency of 10 to 500 kHz can be used.

The catalyst thus obtained may be used for polymerization after the solvent is evaporated off and the catalyst in the form of a solid is taken out or may be used for polymerization as it is.

Further, in the present invention, the catalyst can be produced by performing an operation of carrying at least one of the component (A) and the component (B) on the carrier in the polymerization system. For example, a method in which at least one of the component (A) and the component (B) and the carrier and, if necessary, the organic aluminum compound as the component (C) are added, and an olefin such as ethylene is added at an atmospheric pressure to 2 MPa (gauge) to carry out preliminary polymerization at −20 to 200° C. for about one minute to two hours, thereby forming catalyst particles can be used.

In the present invention, it is desired that the use proportion of the component (B-1) to the carrier is preferably from 1:5 to 1:10,000, more preferably from 1:10 to 1:500 in terms of mass ratio, and the use proportion of the component (B-2) to the carrier is preferably from 1:0.5 to 1:1,000, more preferably from 1:1 to 1:50 in terms of mass ratio. In the case where two or more components as the components (B) are mixed and used, the use proportion of each of the components (B) to the carrier is desirably in the above range in terms of mass ratio. Further, it is desired that the use proportion of the component (A) to the carrier is preferably from 1:5 to 1:10,000, more preferably from 1:10 to 1:500 in terms of mass ratio.

If the use proportion of the component (B) [the component (B-1) or the component (B-2)] to the carrier or the use proportion of the component (A) to the carrier deviates from the above range, the activity decreases in some cases. The thus prepared polymerization catalyst of the present invention has an average particle diameter of usually 2 to 200 preferably 10 to 150 µm, particularly preferably 20 to 100 and has a specific surface area of usually 20 to 1,000 m$^2$/g, preferably 50 to 500 m$^2$/g. If the average particle diameter is less than 2 µm, a fine powder in the polymer increases in some cases, and if the average particle diameter exceeds 200 µm, a coarse particle in the polymer increases in some cases. If the specific surface area is less than 20 m$^2$/g, the activity decreases in some cases, and if the specific surface area exceeds 1,000 m$^2$/g, the bulk density of the polymer decreases in some cases. Further, in the catalyst of the present invention, the amount of the transition metal in 100 g of the carrier is usually from 0.05 to 10 g, particularly preferably from 0.1 to 2 g. If the amount of the transition metal is outside of the above range, the activity decreases in some cases.

An industrially advantageous polymer having a high bulk density and an excellent particle size distribution can be obtained by carrying the catalyst on the carrier in the manner described above.

As the propylene-based polymer of the present invention, by using the polymerization catalyst described above, a propylene homopolymer can be produced by homopolymerization of propylene, or a propylene copolymer can be produced by copolymerization of propylene and ethylene and/or an α-olefin having 4 or more carbon atoms.

In this case, the polymerization method is not particularly limited, and any method such as a slurry polymerization method, a gas-phase polymerization method, a bulk polymerization method, a solution polymerization method, or a suspension polymerization method may be used, however, a slurry polymerization method and a gas-phase polymerization method are particularly preferred. Further, from the viewpoint of the ease of control of the reaction, a solution polymerization method is particularly preferred.

With respect to the polymerization conditions, the polymerization temperature is usually from −100 to 250° C., preferably from −50 to 200° C., more preferably from 0 to 130° C. With respect to the use proportion of the catalyst to the reaction starting material, the starting material monomer/the component (A) described above (molar ratio) is preferably from $10^5$ to $10^8$, particularly preferably from $10^6$ to $10^7$. The polymerization time is usually from 5 minutes to 10 hours, and the reaction pressure is preferably from an atmospheric pressure to 3 MPa (gauge), more preferably from an atmospheric pressure to 2.5 MPa (gauge), further more preferably from an atmospheric pressure to 2 MPa (gauge). By adjusting the reaction pressure, the meso pentad fraction can be controlled.

Examples of the method for controlling the molecular weight of the polymer include selection of the type of the respective catalyst components, the use amount, or the polymerization temperature, and polymerization in the presence of hydrogen.

In the case of using a polymerization solvent, for example, an aromatic hydrocarbon such as benzene, toluene, xylene, or ethylbenzene, an alicyclic hydrocarbon such as cyclopentane, cyclohexane, or methylcyclohexane, an aliphatic hydrocarbon such as pentane, hexane, heptane, or octane, a halogenated hydrocarbon such as chloroform or dichloromethane, or the like can be used. Among these solvents, one type may be used alone or two or more types may be used in combination. Further, a monomer such as an α-olefin may be used as the solvent. The polymerization can be carried out without using a solvent depending on the polymerization method.

In the polymerization, preliminary polymerization can be carried out using the polymerization catalyst described above. The preliminary polymerization can be carried out by bringing, for example, a small amount of an olefin into contact with the solid catalyst component. However, the method is not particularly limited, and a known method can be used. The olefin to be used for the preliminary polymerization is not particularly limited, and for example, ethylene, an α-olefin having 3 to 20 carbon atoms, a mixture thereof, or the like can be used. However, it is advantageous to use the same olefin as used in the polymerization.

The preliminary polymerization temperature is usually from −20 to 200° C., preferably from −10 to 130° C., more preferably from 0 to 80° C. In the preliminary polymerization, an aliphatic hydrocarbon, an aromatic hydrocarbon, a monomer, or the like can be used as a solvent. Among these, an aliphatic hydrocarbon is particularly preferred. The preliminary polymerization may be carried out without using a solvent.

In the preliminary polymerization, it is desired to control the conditions so that the limiting viscosity [η] (measured in decalin at 135° C.) of the preliminary polymerization product is 0.2 dL/g or more, particularly 0.5 dL/g or more, and the amount of the preliminary polymerization product per millimole of the transition metal component in the catalyst is from 1 to 10,000 g, particularly from 10 to 1,000 g.

The propylene-based polymer of the present invention can be applied to the field of adhesives and the like. In particular, as described below, by blending the propylene-based polymer of the present invention in a base polymer as a modifier, a hot melt adhesive having an excellent balance between favorable heat creep resistance and moderate open time can be provided.

[Hot Melt Adhesive of First Embodiment of the Present Invention]

The hot melt adhesive of the first embodiment of the present invention contains an ethylene-based polymer (A) and the propylene-based polymer (B1) of the present invention described above.

The hot melt adhesive of the first embodiment of the present invention contains the propylene-based polymer (B1) of the present invention described above in an amount of 1 to 30 parts by mass, preferably 5 to 25 parts by mass, more preferably 10 to 20 parts by mass with respect to 100 parts by mass of the ethylene-based polymer (A) from the viewpoint of the balance between favorable heat creep resistance and moderate open time. By blending the propylene-based polymer (B1) of the present invention as a modifier in the ethylene-based polymer (A) serving as a base polymer, the hot melt adhesive of the first embodiment of the present invention has an excellent balance between favorable heat creep resistance and moderate open time.

(Ethylene-Based Polymer (A))

The ethylene-based polymer (A) to be used in the present invention is a base polymer of the hot melt adhesive of the present invention, and specific examples thereof include polyethylene and copolymers of ethylene and an olefin having 3 to 10 carbon atoms. From the viewpoint of the adhesiveness, the ethylene-based polymer (A) is preferably an ethylene-α-olefin copolymer. Specific examples of the α-olefin include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In the present invention, among these, one type or two or more types can be used. Among these α-olefins, 1-octene is preferred. From the viewpoint of the adhesiveness, the ethylene-based polymer (A) to be used in the present invention is more preferably an ethylene-1-octene copolymer, further more preferably an ethylene-1-octene copolymer containing 63 to 65% by mass of a structural unit derived from ethylene and 35 to 37% by mass of a structural unit derived from 1-octene.

From the viewpoint of the heat creep resistance, the melting point of the ethylene-based polymer (A) to be used in the present invention is preferably from 60 to 100° C., more preferably from 60 to 75° C. The melting point of the ethylene-based polymer (A) can be measured by differential scanning calorimetry.

Examples of commercially available products of the ethylene-based polymer (A) to be used in the present invention include Exact series (manufactured by Exxon Mobil Corporation) and Affinity Polymer series (manufactured by The Dow Chemical Company), and more preferred examples thereof include Affinity GA1950 (manufactured by The Dow Chemical Company) (all are trade names).

(Tackifier Resin (C))

The hot melt adhesive of the present invention may contain a tackifier resin (C). Examples of the tackifier resin (C) include materials which are composed of a rosin derivative resin, a polyterpene resin, a petroleum resin, an oil-soluble phenolic resin, or the like and are in the form of a solid, a semi-solid, or a liquid at normal temperature. Among these materials, one type may be used alone or two or more types may be used in combination. In the present invention, in consideration of the compatibility with the base polymer, it is preferred to use a hydrogenated material. In particular, a hydrogenated petroleum resin material having excellent heat stability is more preferred.

Examples of commercially available products of the tackifier resin (C) include I-MARV P-125, I-MARV P-100, and I-MARV P-90 (all manufactured by Idemitsu Kosan Co., Ltd.), Yumex 1001 (manufactured by Sanyo Chemical Industries, Ltd.), Hi-Rez T 1115 (manufactured by Mitsui Chemicals, Incorporated), Clearon K 100 (manufactured by Yasuhara Chemical Co., Ltd.), ECR 227 and Escorez 2101 (both manufactured by Tonex Co., Ltd.), Arkon P-100 (manufactured by Arakawa Chemical Industries, Ltd.), Regalrez 1078 (manufactured by Hercules, Inc.), and Eastotac H-130R (manufactured by Eastman Chemical Company) (all are trade names).

From the viewpoint of the improvement of the adhesiveness and also the improvement of the wettability to an adherend due to a decrease in the viscosity, the content of the tackifier resin (C) in the hot melt adhesive of the present invention is preferably from 50 to 200 parts by mass, more preferably from 70 to 150 parts by mass, further more preferably from 80 to 120 parts by mass with respect to 100 parts by mass of the ethylene-based polymer (A).

(Wax (D))

The hot melt adhesive of the present invention may contain a wax (D).

Examples of the wax (D) include animal waxes, vegetable waxes, carnauba waxes, candelilla waxes, Japan waxes, beeswaxes, mineral waxes, petroleum waxes, paraffin waxes, microcrystalline waxes, petrolatum, polyethylene waxes, polyethylene oxide waxes, polypropylene waxes, polypropylene oxide waxes, higher fatty acid waxes, higher fatty acid ester waxes, and Fischer-Tropsch waxes.

From the viewpoint of the improvement of the flexibility and also the improvement of the wettability due to a decrease in the viscosity, the content of the wax (D) in the hot melt adhesive of the present invention is preferably from 50 to 200 parts by mass, more preferably from 60 to 150 parts by mass, further more preferably from 70 to 120 parts by mass with respect to 100 parts by mass of the ethylene-based polymer (A). The viscosity of the hot melt adhesive decreases with the increase in the addition amount of the wax.

(Additive)

Further, the hot melt adhesive of the present invention may contain a variety of additives such as a plasticizer, an inorganic filler, and an antioxidant as needed.

Examples of the plasticizer include paraffin-based process oils, naphthene-based process oils, phthalate esters, adipate esters, fatty acid esters, glycols, and epoxy-based polymer plasticizers.

Examples of the inorganic filler include clay, talc, calcium carbonate, and barium carbonate.

Examples of the antioxidant include phosphorus-based antioxidants such as Tris(nonylphenyl)phosphite, distearyl pentaerythritol diphosphite, Adekastab 1178 (manufactured by Adeka Corporation), Sumilizer TNP (manufactured by Sumitomo Chemical Co., Ltd.), Irgafos 168 (manufactured by BASF Co., Ltd.), and Sandstab P-EPQ (manutactured by Sandoz K.K.), phenolic antioxidants such as 2,6-di-t-butyl-4-methylphenol, n-octadecyl-3-(3',5'-di-t-butyl-4-hydroxyphenyl)propionate, Sumilizer BHT (manufactured by Sumitomo Chemical Co., Ltd.), and Irganox 1010 (manufactured by BASF Co., Ltd.), and sulfur-based antioxidants such as dilauryl-3,3'-thiodipropionate, pentaerythritoltetrakis-(3-laurylthiopropionate), Sumilizer TPL (manufactured by Sumitomo Chemical Co., Ltd.), Yoshinox DLTP (manufactured by Yoshitomi Pharmaceutical Industries, Ltd.), and AntiOx L (manufactured by NOF Corporation).

[Hot Melt Adhesive of Second Embodiment of the Present Invention]

The hot melt adhesive of the second embodiment of the present invention contains an ethylene-based polymer (A) and the propylene-based polymer (B2) which satisfies the following (a2) and (b2):

(a2) [mmmm]=20 to 80 mol %; and
(b2) weight-average molecular weight (Mw)=1,000 to 150,000.

The hot melt adhesive of the second embodiment of the present invention contains the propylene-based polymer (B2) of the present invention described above in an amount of 1 to 30 parts by mass, preferably 5 to 25 parts by mass, more preferably 10 to 20 parts by mass with respect to 100 parts by mass of the ethylene-based polymer (A) from the viewpoint of the balance between favorable heat creep resistance and moderate open time. By blending the propylene-based polymer (B2) of the present invention as a modifier in the ethylene-based polymer (A) serving as a base polymer, the hot melt adhesive of the second embodiment of the present invention has an excellent balance between favorable heat creep resistance and moderate open time.

The ethylene-based polymer (A), the tackifier resin (C), the wax (D), and a variety of additives in the hot melt adhesive of the second embodiment of the present invention are the same as those described with respect to the hot melt adhesive of the first embodiment of the present invention.

(Propylene-Based Polymer (B2))

The propylene-based polymer (B2) to be used in the hot melt adhesive of the second embodiment of the present invention satisfies the following (a2) and (b2), and preferably further satisfies the following (c2) to (e2).

(a2) [mmmm]=20 to 80 mol %
(b2) weight-average molecular weight (Mw)=1,000 to 150,000
(c2) Mw/Mn≤2.5
(d2) [rmrm]≥2.5 mol %
(e2) melting point (Tm–D)=0 to 140° C.

(a2) Meso Pentad Fraction [mmmm]

The meso pentad fraction [mmmm] of the propylene-based polymer (B2) to be used in the hot melt adhesive of the second embodiment of the present invention is from 20 to 80 mol %. The [mmmm] of less than 20 mol % is not preferred from the viewpoint of a decrease in the heat creep resistance. Further, the [mmmm] of more than 80 mol % is not preferred from the viewpoint of a decrease in the open time.

From the viewpoint of the open time, the meso pentad fraction [mmmm] is preferably from 20 to 70 mol %, more preferably from 47 to 70 mol %, further more preferably from 48 to 60 mol %. On the other hand, from the viewpoint of the balance between favorable heat creep resistance and moderate open time, the meso pentad fraction [mmmm] is preferably more than 60 mol % and 80 mol % or less, more preferably more than 60 mol % and 75 mol % or less, further more preferably more than 60 mol % and 72 mol % or less.

(b2) Weight-Average Molecular Weight (Mw)

The weight-average molecular weight of the propylene-based polymer (B2) to be used in the hot melt adhesive of the second embodiment of the present invention is from 1,000 to 150,000. The weight-average molecular weight of less than 1,000 is not preferred from the viewpoint of a decrease in the heat creep resistance and the cohesive force. Further, the weight-average molecular weight of more than 150,000 is not preferred from the viewpoint of a decrease in the coatability due to an increase in the melt viscosity.

From the viewpoint of the open time and also from the viewpoint of the balance between favorable heat creep resistance and moderate open time, the weight-average molecular weight is preferably from 10,000 to 100,000, more preferably from 15,000 to 80,000.

(c2) Molecular Weight Distribution (Mw/Mn)

The molecular weight distribution (Mw/Mn) of the propylene-based polymer (B2) to be used in the hot melt adhesive of the second embodiment of the present invention is 2.5 or less. When the molecular weight distribution is 2.5 or less, a favorable coatability is exhibited. From this point of view, the molecular weight distribution is preferably 2.4 or less, more preferably 2.2 or less.

(d2) Racemic Meso Racemic Meso Fraction [rmrm]

The racemic meso racemic meso fraction [rmrm] of the propylene-based polymer (B2) to be used in the hot melt adhesive of the second embodiment of the present invention is 2.5 mol % or more. The [rmrm] of 2.5 mol % or more is preferred from the viewpoint of the improvement of the open time. From this point of view, the racemic meso racemic meso fraction [rmrm] is preferably from 2.6 to 5.0 mol %, more preferably from 2.7 to 5.0 mol %.

(e2) Melting Point (Tm–D)

The melting point (Tm–D) of the propylene-based polymer (B2) to be used in the hot melt adhesive of the second embodiment of the present invention is preferably from 0 to 140° C., more preferably from 20 to 120° C., further more preferably from 40 to 100° C. from the viewpoint of the improvement of the open time and also the improvement of the heat creep resistance.

The monomer type in the propylene-based polymer (B2) is the same as the monomer in the propylene-based polymer of the present invention.

Further, the measurement methods for the meso pentad fraction [mmmm], the racemic meso racemic meso pentad fraction [rmrm], the weight-average molecular weight (Mw), the molecular weight distribution (Mw/Mn), and the melting point (Tm–D) are the same as those described above with respect to the propylene-based polymer of the present invention.

(Production Method for Propylene-Based Polymer (B2))

Examples of the production method for the propylene-based polymer (B2) to be used in the hot melt adhesive of the second embodiment of the present invention include a production method for a propylene homopolymer by homopolymerization of propylene using a metallocene catalyst and a production method for a propylene copolymer by copolymerization of propylene and ethylene and/or an α-olefin having 4 or more carbon atoms using a metallocene catalyst in the same manner as the production method for the propylene-based polymer (propylene-based polymer (B1)) of the present invention described above. The crystallinity of the polyolefin to be obtained can be controlled by appropriately selecting the catalyst, and thus, the propylene-based polymer (B2) can be obtained.

Examples of the metallocene catalyst which can be used in the production of the propylene-based polymer (B2) include those described in JP-A 2000-256411.

Examples of commercially available products of the propylene-based polymer (B2) include L-MODU 5400 (manufactured by Idemitsu Kosan Co., Ltd.).

[Hot Melt Adhesive of Third Embodiment of the Present Invention]

The hot melt adhesive of the third embodiment of the present invention contains the propylene-based polymer (B1) of the present invention described above as a base polymer. In the hot melt adhesive, the propylene-based polymer (B1) of the present invention is contained in an amount of preferably 55% by mass or more, more preferably 60% by mass or more, further more preferably 65% by mass or more.

Since the propylene-based polymer (B1) of the present invention to be contained as a base polymer is relatively hard, the hot melt adhesive of the third embodiment of the present invention is not suitable as an adhesive for packaging, the coating amount of which in use is small, but is suitable as an adhesive for woodwork, the coating amount of which in use is large. In general, an adhesive for woodwork to be used in a kitchen or the like is required to have durability at higher temperatures. On the other hand, the hot melt adhesive of the third embodiment of the present invention has excellent heat creep resistance, and moreover has an excellent balance between favorable heat creep resistance and moderate open time.

(Production Method for Hot Melt Adhesive)

The hot melt adhesive of the first or second embodiment of the present invention can be produced by dry blending the ethylene-based polymer (A) and the propylene-based polymer (B1) or (B2), and if necessary, the tackifier resin (C), the wax (D), and a variety of additives using a Henschel mixer or the like, and melt-kneading the components using a single-screw or twin-screw extruder, a Plast mill, a Banbury mixer, or the like. Further, the hot melt adhesive of the third embodiment of the present invention can be produced by dry blending the propylene-based polymer (B1) as a base polymer, and if necessary, the ethylene-based polymer (A), the tackifier resin (C), the wax (D), and a variety of additives using a Henschel mixer or the like, and melt-kneading the components using a single-screw or twin-screw extruder, a Plast mill, a Banbury mixer, or the like.

The hot melt adhesive of the present invention can be favorably used as an adhesive for packaging such as a corrugated cardboard and an adhesive for woodwork.

Here, examples of the adhesive include adhesives such as rubber-based, acrylic, silicone-based, and urethane-based adhesives, and other than these, reactive adhesives such as epoxy resin and acrylic resin adhesives, solvent-type adhesives such as vinyl acetate-based and rubber-based adhesives, aqueous adhesives such as vinyl acetate-based emulsion, EVA-based emulsion, and synthetic rubber-based latex adhesives, and adhesives and bonding agents such as hot melt adhesives, phenolic adhesives, and silicone-based adhesives.

In particular, the material obtained according to the present invention has excellent applicability to a hot melt adhesive and can be used for controlling the solidification rate or the melt viscosity. Further, the improvement of handleability and the like are achieved due to prevention of bleeding (effusion) of oil, suppression of stickiness, and the like. For example, it is considered that when a base polymer having a low tensile elastic modulus is added, the open time can be prolonged, and when a base polymer having a high tensile elastic modulus is added, the set time can be shortened.

Here, the melt viscosity is useful as an index for determining whether or not a hot melt adhesive can be coated by ejection from a nozzle. A too high melt viscosity causes stringiness, and therefore is not preferred from the practical viewpoint. Incidentally, in the case of a hot melt adhesive for woodwork, the coating of the adhesive is performed without using a nozzle, and therefore, even if the melt viscosity is high, there is no practical problem.

(Bonding Method)

The bonding method of the present invention is a method for bonding a base material to another base material, and includes a step of melting the hot melt adhesive of the present invention and coating the adhesive onto at least one base material, and a step of bonding the other base material to the coated hot melt adhesive.

EXAMPLES

Next, the present invention will be more specifically described with reference to Examples, but the present invention is by no means limited thereto.

Synthesis Example 1

Complex A ((1,2'-dimethylsilylene)(2,1'-dimethylsilylene)(indenyl)(3-trimethylsilylmethyl-indenyl) zirconium) dichloride)

(1,2'-Dimethylsilylene)(2,1'-dimethylsilylene)(indenyl) (3-trimethylsilylmethyl-indenyl)zirconium dichloride was synthesized according to the description in Example 5 of Japanese Patent No. 4053993.

Synthesis Example 2

Complex B ((1,2'-dimethylsilylene)(2,1'-dimethylsilylene)-bis(3-trimethylsilylmethyl-indenyl)zirconium dichloride)

(1,2'-Dimethylsilylene)(2,1'-dimethylsilylene)-bis(3-trimethylsilylmethylindenyl)-zirconium dichloride was synthesized according to the description in Reference Example 1 of Japanese Patent No. 4053993.

Synthesis Example 3

Complex C ((1,2'-dimethylsilylene)(2,1'-dimethylsilylene)-bis(indenyl)zirconium dichloride)

(1,2'-Dimethylsilylene)(2,1'-dimethylsilylene)-bis(indenyl)zirconium dichloride was synthesized according to the description in Example 1 of JP-A 2000-256411.

Production Example 1

Production of Polypropylene 1

To a stainless steel reactor having an internal volume of 0.2 m$^3$ and equipped with a stirrer, n-heptane at 25 L/h, triisobutylaluminum at 25 mmol/h, and further a catalyst component obtained by previously bringing dimethylanilinium tetrakis(pentafluorophenyl)-borate, the complex A, triisobutylaluminum, and propylene into contact with one another at 1.2 μmol/h in terms of zirconium were continuously supplied.

Then, propylene and hydrogen were continuously supplied thereto so that a hydrogen concentration in the gas phase was kept at 2.5 mol % and the total pressure in the reactor was kept at 1.0 MPa·G at a polymerization temperature of 65° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 1) was obtained.

Production Example 2

Production of Polypropylene 2

To a stainless steel reactor having an internal volume of 0.2 m$^3$ and equipped with a stirrer, n-heptane at 25 L/h, triisobutylaluminum at 25 mmol/h, and further a catalyst component obtained by previously bringing dimethylanilinium tetrakis(pentafluorophenyl)-borate, the complex A, triisobutylaluminum, and propylene into contact with one another at 1.8 μmol/h in terms of zirconium were continuously supplied.

Then, propylene and hydrogen were continuously supplied thereto so that a hydrogen concentration in the gas phase was kept at 1.5 mol % and the total pressure in the reactor was kept at 1.0 MPa·G at a polymerization temperature of 65° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 2) was obtained.

Production Example 3

Production of Polypropylene 3

To a stainless steel reactor having an internal volume of 68 m$^3$ and equipped with a stirrer, n-heptane at 5.2 m$^3$/h, triisobutylaluminum at 0.6 mol/h, and further a catalyst component obtained by previously bringing dimethylanilinium tetrakis(pentafluorophenyl)-borate, the complex B, triisobutylaluminum, and propylene into contact with one another at 0.7 mmol/h in terms of zirconium were continuously supplied.

Then, propylene and hydrogen were continuously supplied thereto so that a hydrogen concentration in the gas phase was kept at 5.0 mol % and the total pressure in the reactor was kept at 1.7 MPa·G at a polymerization temperature of 85° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 3) was obtained.

Production Example 4

Production of Polypropylene 4

To a stainless steel reactor having an internal volume of 0.2 m$^3$ and equipped with a stirrer, n-heptane at 25 L/h, triisobutylaluminum at 25 mmol/h, and further a catalyst component obtained by previously bringing dimethylanilinium tetrakis(pentafluorophenyl)-borate, the complex C, triisobutylaluminum, and propylene into contact with one another at 1.2 μmol/h in terms of zirconium were continuously supplied.

Then, propylene and hydrogen were continuously supplied thereto so that a hydrogen concentration in the gas phase was kept at 0.66 mol % and the total pressure in the reactor was kept at 0.66 MPa·G at a polymerization temperature of 70° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 4) was obtained.

Production Example 5

Production of Polypropylene 5

A propylene homopolymer (polypropylene 5) was obtained in the same manner as in the Production Example 4 except that propylene and hydrogen were continuously supplied to the polymerization solution so that a hydrogen concentration in the gas phase was kept at 3.5 mol % and the total pressure in the reactor was kept at 0.7 MPa·G at a polymerization temperature of 60° C.

Production Example 6

Production of Polypropylene 6

A propylene homopolymer (polypropylene 6) was obtained in the same manner as in the Production Example 4 except that propylene and hydrogen were continuously supplied to the polymerization solution so that a hydrogen concentration in the gas phase was kept at 0.66 mol % and the total pressure in the reactor was kept at 0.66 MPa·G at a polymerization temperature of 60° C.

[Evaluation of Stereoregularity: NMR Measurement]

With respect to the polypropylenes 1 to 6 obtained in the Production Examples 1 to 6, the $^{13}$C-NMR spectrum was measured using the following device under the following conditions. The assignment of a peak was carried out in accordance with the method proposed in "Macromolecules, 8, 687 (1975)" by A. Zambelli, et al. The results are shown in Table 1.

Device: $^{13}$C-NMR spectrometer, JNM-EX400 series manufactured by JEOL, Ltd.
Method: proton complete decoupling method
Concentration: 220 mg/mL
Solvent: a mixed solvent of 1,2,4-trichlorobenzene and deuterated benzene at 90:10 (volume ratio)
Temperature: 130° C.

Pulse width: 45°
Pulse repetition time: 4 seconds
Accumulation: 10,000 times
<Calculation Formulae>
M=m/S×100
R=γ/S×100
S=Pββ+Pαα+Pαγ
S: signal strength of side-chain methyl carbon atom in all propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: meso pentad chain: 21.7 to 22.5 ppm The meso pentad fraction [mmmm] and the racemic meso racemic meso pentad fraction [rmrm] are determined in accordance with the method proposed in "Macromolecules, 6, 925 (1973)" by A. Zambelli et al, and are a meso fraction and a racemic meso racemic meso fraction in a pentad unit in a polypropylene molecular chain measured with the signal of a methyl group in the $^{13}$C-NMR spectrum. The stereoregularity increases with the increase in the meso pentad fraction [mmmm]

[Measurement of Weight-Average Molecular Weight (Mw) and Molecular Weight Distribution (Mw/Mn)]

With respect to the polypropylenes 1 to 6 obtained in the Production Examples 1 to 6, according to the gel permeation chromatography (GPC) method, the weight-average molecular weight (Mw) and the molecular weight distribution (Mw/Mn) were obtained. In the measurement, the following device was used under the following conditions, and the weight-average molecular weight in terms of polystyrene was obtained. The results are shown in Table 1.

<GPC Measuring Device>
Column: TOSO GMHHR-H(S)HT
Detector: RI detector for liquid chromatography, Waters 150C
<Measurement Conditions>
Solvent: 1,2,4-trichlorobenzene
Measurement temperature: 145° C.
Flow rate: 10 mL/min
Sample concentration: 2.2 mg/mL
Injection amount: 160 μL
Calibration curve: Universal Calibration
Analysis software: HT-GPC (ver. 1.0)

[Limiting Viscosity (η)]

With respect to the polypropylenes 1 to 6 obtained in the Production Examples 1 to 6, 0.02 to 0.16 g/dL solutions were subjected to measurement at 135° C. using a viscometer (manufactured by RIGO Co., Ltd., trade name: "VMR-053U-PC-F01"), an Ubbelohde type viscosity tube (bulb volume in measurement: 2 to 3 mL, capillary diameter: 0.44 to 0.48 mm), and tetralin as the solvent. The results are shown in Table 1.

[Melting Point (Tm–D)]

With respect to the polypropylenes 1 to 6 obtained in the Production Examples 1 to 6, the melting point (Tm–D) was determined from the top of a peak observed on the highest temperature side in a melting endothermic curve obtained by using a differential scanning calorimeter (manufactured by PerkinElmer Co., Ltd., DSC-7), and keeping 10 mg of a sample in a nitrogen atmosphere at –10° C. for 5 minutes, and then raising the temperature at 10° C./min. Further, with respect also to blends of two types of polypropylenes used in Examples 6 and 8 to 10, which will be described below, the racemic meso racemic meso pentad fraction [rmrm] and the melting point (Tm–D) were determined in the same manner described above. The results are shown in Table 1.

TABLE 1

(a)

|  | Production Example 1 Polypropylene 1 | Production Example 2 Polypropylene 2 | Production Example 3 Polypropylene 3 | Production Example 4 Polypropylene 4 | Production Example 5 Polypropylene 5 | Production Example 6 Polypropylene 6 |
|---|---|---|---|---|---|---|
| [mmmm] (mol %) | 62 | 62 | 47 | 70 | 70 | 70 |
| [rmrm] (mol %) | 1.5 | 1.4 | 3.0 | 0.9 | 0.9 | 1.0 |
| Limiting viscosity η (dl/g) | 0.32 | 0.41 | 0.44 | 0.30 | 0.20 | 0.45 |
| Weight-average molecular weight Mw | 36,000 | 51,000 | 51,000 | 32,000 | 14,000 | 51,000 |
| Molecular weight distribution Mw/Mn | 1.9 | 2.0 | 2.0 | 2.3 | 1.9 | 2.4 |
| Melting point Tm-D (° C.) | 103 | 103 | 75 | 117 | 117 | 117 |

(b)

|  | Example 6 | Example 8 | Example 9 | Example 10 |
|---|---|---|---|---|
| Polypropylene 3 | 50 | 25 | 50 | 75 |
| Polypropylene 5 | 50 | — | — | — |
| Polypropylene 6 | — | 75 | 50 | 25 |
| Melting point Tm-D (° C.) | 110 | 113 | 111 | 104 |
| [rmrm] (mol %) | 1.8 | 1.3 | 1.7 | 2.4 |

Starting materials used in the production of the following hot melt adhesives are shown.

<Ethylene-Based Polymer (A) (Base Polymer)> an ethylene-1-octene copolymer (trade name: Affinity GA1950, manufactured by The Dow Chemical Company, weight-average molecular weight: 38,000, 1-octene content: 35 to 37% by weight, melt flow rate: 500 g/10 min)

<Propylene-Based Polymer (B)>

(B-X) an ethylene-propylene copolymer (trade name: Licocene PP 2602, manufactured by Clariant Corporation, ethylene: propylene=15 mol %: 85 mol %)

(B-Y) a polypropylene (trade name: Biscol 660-P, manufactured by Sanyo Chemical Industries, Ltd.)

(B-Z) an ethylene-propylene-butene copolymer (trade name: VESTOPLAST 708, manufactured by Evonik Industries, weight-average molecular weight (Mw): 75,000, molecular weight distribution (Mw/Mn): 6.5)

<Tackifier Resin (C)>

(C-1) a hydrogenated derivative of an aliphatic hydrocarbon petroleum resin (trade name: Eastotac H-130R, manufactured by Eastman Chemical Company, softening point: 130° C.)

(C-2) a hydrogenated petroleum resin (trade name: I-MARV P-125, manufactured by Idemitsu Kosan Co., Ltd., softening point: 125° C.)

<Wax (D)>

(D-1) a Fischer-Tropsch wax (trade name: Paraflint H1, manufactured by Sasol Wax GmbH)

(D-2) a polypropylene wax (trade name: Biscol 660-P, manufactured by Sanyo Chemical Industries, Ltd.)

Comparative Examples 1 to 4, Examples 1 to 14, Reference Examples 1 to 5

Production of Hot Melt Adhesive for Packaging

The materials shown in Tables 2 and 3 were put into SUS cans at the blending ratios shown in Tables 2 and 3 and melted by heating to 180° C. for 30 minutes, followed by mixing and stirring with a stirring blade for 15 minutes, whereby hot melt adhesives were produced. With respect to the thus obtained hot melt adhesives, the following evaluation was carried out.

<Open Time>

The "open time" refers to a tackiness retention time from when an adhesive is coated onto an adherend to when the temperature is decreased and the tackiness disappears.

The hot melt adhesive melted by heating to 180° C. was coated onto K-liner corrugated cardboards in a coating amount of 2.8 to 3.2 g/m, and after the elapse of a predetermined time, the cardboards were bonded to each other under the conditions that the bonding pressure was 2 kg/25 cm$^2$ and the set time was 2 seconds. The bonded test piece was left to stand in an environment at a temperature of 23° C. and a humidity of 50% for 24 hours, and then the cardboards were peeled from each other by hand. The longest elapsed time when four or more test pieces exhibiting a material destruction ratio of 80% or more among five measurements was determined as "open time (sec)".

(Evaluation of Open Time)

The thus obtained value of the open time was evaluated according to the following criteria.

A (4 points): The open time is 15 seconds or more.

B (3 points): The open time is 14 seconds or more and less than 15 seconds.

C (2 points): The open time is 13 seconds or more and less than 14 seconds.

D (1 point): The open time is less than 13 seconds.

<Set Time>

The "set time" refers to a time from when the hot melt adhesive is bonded to an adherend to when the hot melt adhesive is solidified by cooling to exhibit an initial adhesive strength.

The hot melt adhesive melted by heating to 180° C. was coated onto K-liner corrugated cardboards in a coating amount of 2.8 to 3.2 g/m, and after an open time of 2 seconds, the cardboards were bonded to each other at a bonding pressure of 2 kg/25 cm$^2$. The bonded test piece was placed in an environment at a temperature of 23° C. and a humidity of 50% for a predetermined pressing time, and thereafter, the cardboards were peeled from each other. The shortest pressing elapsed time when four or more test pieces exhibiting a material destruction ratio of 80% or more among five measurements was determined as "set time (sec)".

<Constant Temperature Creep>

The "constant temperature creep" is an index indicating the heat creep resistance of an adhesive, and as the peeling time is longer, the adhesive has heat creep resistance, and peeling hardly occurs during transportation or the like, and therefore, the longer peeling time is preferred.

The hot melt adhesive melted by heating to 180° C. was coated onto K-liner corrugated cardboards in a coating amount of 2.8 to 3.2 g/m, and after an open time of 2 seconds, the cardboards were bonded to each other under the conditions that the bonding pressure was 2 kg/25 cm$^2$ and the set time was 2 seconds. The bonded test piece was left to stand in an environment at a temperature of 23° C. and a humidity of 50% for 24 hours. Then, a load of 200 g/g/25 cm$^2$ was applied to the thus prepared test piece in the stress direction in an environment at a temperature of 60° C. and a humidity of 30%, and a time until the bonded sample was peeled off was measured. The measurement was carried out 5 times, and an average of three measurements excluding the longest and shortest peeling times was determined as the value of the constant temperature creep test.

(Evaluation of Heat Creep Resistance)

The thus obtained value of the constant temperature creep was evaluated according to the following criteria.

AA (6 points): The value of the constant temperature creep is longer than 100 minutes.

A (5 points): The value of the constant temperature creep is 80 minutes or more and 100 minutes or less.

B (4 points): The value of the constant temperature creep is 70 minutes or more and less than 80 minutes.

C (3 points): The value of the constant temperature creep is 60 minutes or more and less than 70 minutes.

D (2 points): The value of the constant temperature creep is 50 minutes or more and less than 60 minutes.

E (1 point): The value of the constant temperature creep is less than 50 minutes.

<Melt Viscosity>

Each of the hot melt adhesives was melted at 180° C., and by using TVB-15 type Brookfield viscometer, the viscosity of the adhesive was measured with an M2 rotor.

When the melt viscosity is high, stringiness is more likely to occur, however, when the melt viscosity at 180° C. is 1,500 mPa·s or less, stringiness is less likely to occur and the coatability is excellent.

<Comprehensive Evaluation>

With respect to the evaluation of the open time and the evaluation of the heat creep resistance described above, comprehensive evaluation was carried out according to the following criteria.

Good: The sum of the points of the evaluation of the open time and the evaluation of the heat creep resistance is 6 points or more.

Moderate: The sum of the points of the evaluation of the open time and the evaluation of the heat creep resistance is 4 points or more and less than 6 points.

Bad: The sum of the points of the evaluation of the open time and the evaluation of the heat creep resistance is less than 4 points.

TABLE 2

| | | | Comparative Example 1 | Comparative Example 2 | Comparative Example 3 | Comparative Example 4 |
|---|---|---|---|---|---|---|
| Composition (parts by mass) | (A) | Ethylene-based copolymer *1 | 35 | 40 | 35 | 35 |
| | (B) | Polypropylene 1 | — | — | — | — |
| | | Polypropylene 2 | — | — | — | — |
| | | Polypropylene 3 | — | — | — | — |
| | | Polypropylene 4 | — | — | — | — |
| | | Polypropylene 5 | — | — | — | — |
| | | Polypropylene 6 | — | — | — | — |
| | | Propylene-based copolymer (B-X) *2 | — | — | 5 | — |
| | | Polypropylene (B-Y) *3 | — | — | — | 5 |
| | (C) | Tackifier resin (C-1) *4 | 35 | 30 | 35 | 35 |
| | (D) | Wax (D-1) *5 | 30 | 30 | 25 | 25 |
| Open time (sec) | | | 12 | 12 | 13 | 6 |
| Set time (sec) | | | 8 | 9 | 7 | 10 |
| Constant temperature creep 60° C., 30% (min) | | | 59 | 20 | 29 | 49 |
| Evaluation of open time | | | D | D | C | D |
| Evaluation of heat creep resistance | | | D | E | E | E |
| Comprehensive evaluation | | | bad | bad | bad | bad |

| | | | Reference Example 1 | Reference Example 2 | Reference Example 3 | Reference Example 4 | Reference Example 5 |
|---|---|---|---|---|---|---|---|
| Composition (parts by mass) | (A) | Ethylene-based copolymer *1 | 35 | 35 | 35 | 35 | 30 |
| | (B) | Polypropylene 1 | — | — | — | — | — |
| | | Polypropylene 2 | — | — | — | — | — |
| | | Polypropylene 3 | 5 | 10 | 5 | 5 | 5 |
| | | Polypropylene 4 | — | — | — | — | — |
| | | Polypropylene 5 | — | — | — | — | — |
| | | Polypropylene 6 | — | — | — | — | — |
| | | Propylene-based copolymer (B-X) *2 | — | — | — | — | — |
| | | Polypropylene (B-Y) *3 | — | — | — | — | — |
| | (C) | Tackifier resin (C-1) *4 | 35 | 35 | 30 | 35 | 35 |
| | (D) | Wax (D-1) *5 | 30 | 30 | 30 | 25 | 30 |
| Open time (sec) | | | 15 | 16 | 14 | 17 | 13 |
| Set time (sec) | | | 7 | 7 | 8 | 7 | 6 |
| Constant temperature creep 60° C., 30% (min) | | | 37 | 15 | 17 | 38 | 65 |
| Evaluation of open time | | | A | A | B | A | C |
| Evaluation of heat creep resistance | | | E | E | E | E | C |
| Comprehensive evaluation | | | moderate | moderate | moderate | moderate | moderate |

| | | | Example 1 | Example 2 | Example 3 | Example 4 | Example 5 |
|---|---|---|---|---|---|---|---|
| Composition (parts by mass) | (A) | Ethylene-based copolymer *1 | 35 | 30 | 35 | 35 | 35 |
| | (B) | Polypropylene 1 | 5 | — | — | 10 | — |
| | | Polypropylene 2 | — | 5 | 5 | — | — |
| | | Polypropylene 3 | — | — | — | — | — |
| | | Polypropylene 4 | — | — | — | — | 5 |
| | | Polypropylene 5 | — | — | — | — | — |
| | | Polypropylene 6 | — | — | — | — | — |
| | | Propylene-based copolymer (B-X) *2 | — | — | — | — | — |
| | | Polypropylene (B-Y) *3 | — | — | — | — | — |
| | (C) | Tackifier resin (C-1) *4 | 35 | 35 | 35 | 35 | 35 |
| | (D) | Wax (D-1) *5 | 25 | 30 | 25 | 20 | 25 |
| Open time (sec) | | | 17 | 12 | 16 | 18 | 15 |
| Set time (sec) | | | 7 | 5 | 7 | 8 | 8 |
| Constant temperature creep 60° C., 30% (min) | | | 83 | 122 | 87 | 128 | 52 |
| Evaluation of open time | | | A | D | A | A | A |
| Evaluation of heat creep resistance | | | A | AA | A | AA | D |
| Comprehensive evaluation | | | good | good | good | good | good |

TABLE 2-continued

| | | | Example 6 | Example 7 | Example 8 | Example 9 | Example 10 |
|---|---|---|---|---|---|---|---|
| Composition (parts by mass) | (A) | Ethylene-based copolymer *1 | 35 | 35 | 35 | 35 | 35 |
| | (B) | Polypropylene 1 | — | — | — | — | — |
| | | Polypropylene 2 | — | — | — | — | — |
| | | Polypropylene 3 | 2.5 | — | 1.25 | 2.5 | 3.75 |
| | | Polypropylene 4 | — | — | — | — | — |
| | | Polypropylene 5 | 2.5 | — | — | — | — |
| | | Polypropylene 6 | — | 5 | 3.75 | 2.5 | 1.25 |
| | | Propylene-based copolymer (B-X) *2 | — | — | — | — | — |
| | | Polypropylene (B-Y) *3 | — | — | — | — | — |
| | (C) | Tackifier resin (C-1) *4 | 35 | 35 | 35 | 35 | 35 |
| | (D) | Wax (D-1) *5 | 25 | 25 | 25 | 25 | 25 |
| | Open time (sec) | | 12 | 15 | 16 | 15 | 15 |
| | Set time (sec) | | 5 | 8 | 8 | 8 | 8 |
| | Constant temperature creep 60° C., 30% (min) | | 88 | 59 | 83 | 77 | 65 |
| | Evaluation of open time | | D | A | A | A | A |
| | Evaluation of heat creep resistance | | A | D | A | B | C |
| | Comprehensive evaluation | | good | good | good | good | good |

*1: an ethylene-1-octene copolymer (trade name: Affinity GA1950, manufactured by The Dow Chemical Company)
*2: an ethylene-propylene copolymer (trade name: Licocene PP 2602, manufactured by Clariant Corporation)
*3: a polypropylene (trade name: Biscol 660-P, manufactured by Sanyo Chemical Industries, Ltd.)
*4: a hydrogenated derivative of an aliphatic hydrocarbon petroleum resin (trade name: Eastotac H-130R, manufactured by Eastman Chemical Company)
*5: a Fischer-Tropsch wax (trade name: Paraflint H1, manufactured by Sasol Wax GmbH)

TABLE 3

| | | | Comparative Example 1 | Example 11 | Example 12 | Example 3 | Example 13 | Example 14 |
|---|---|---|---|---|---|---|---|---|
| Composition (parts by mass) | (A) | Ethylene-based copolymer *1 | 35 | 35 | 35 | 35 | 35 | 35 |
| | (B) | Polypropylene 2 | — | 1 | 3 | 5 | 7 | 10 |
| | (C) | Tackifier resin (C-1) *4 | 35 | 35 | 35 | 35 | 35 | 35 |
| | (D) | Wax (D-1) *5 | 30 | 29 | 27 | 25 | 23 | 20 |
| | Open time (sec) | | 12 | 15 | 17 | 16 | 20 | 16 |
| | Set time (sec) | | 8 | 7 | 7 | 7 | 7 | 8 |
| | Constant temperature creep 60° C., 30% (min) | | 59 | 66 | 82 | 87 | 144 | 127 |
| | Melt viscosity 180° C. (mPa · s) | | 720 | 720 | 840 | 910 | 1,160 | 1,360 |
| | Evaluation of open time | | D | A | A | A | A | A |
| | Evaluation of heat creep resistance | | D | C | A | A | AA | AA |
| | Comprehensive evaluation | | bad | good | good | good | good | good |

*1: an ethylene-1-octene copolymer (trade name: Affinity GA1950, manufactured by The Dow Chemical Company)
*4: a hydrogenated derivative of an aliphatic hydrocarbon petroleum resin (trade name: Eastotac H-130R, manufactured by Eastman Chemical Company)
*5: a Fischer-Tropsch wax (trade name: Paraflint H1, manufactured by Sasol Wax GmbH)

The hot melt adhesives of Examples 1 to 14 using the propylene-based polymer of the present invention have an excellent balance between heat creep resistance and moderate open time. In the case of Examples 1, 3, 4, and 8 to 14, both of the open time and the heat creep resistance are improved, and therefore, the adhesives are particularly preferred. In the case of Examples 2 and 5 to 7, one of the open time and the heat creep resistance is comparable and the other is improved as compared with the case of Comparative Example 1 in which the propylene-based polymer is not used. The hot melt adhesives of the second embodiment of the present invention of Reference Examples 1 to 5 have moderate heat creep resistance, but have a long open time.

Comparative Examples 5 to 8, Examples 15 to 16, and Reference Examples 6 to 7

Production of Hot Melt Adhesive for Woodwork

The materials shown in Table 4 were put into SUS cans at the blending ratios shown in Table 4 and stirred and mixed at 180° C. for 30 minutes, whereby hot melt adhesives were produced. With respect to the thus obtained hot melt adhesives, the following evaluation was carried out.

<Open Time>

The hot melt adhesive melted by heating to 170° C. was coated onto a paper (common paper: 65 g/m²) to a thickness of 200 μm.

Thereafter, the paper piece coated with the hot melt adhesive was bonded to a wood material at room temperature at predetermined time intervals, and then, a 5-kg weight was placed thereon for 5 minutes, followed by cooling. After 30 minutes later, the paper and the wood material were peeled from each other by hand, and the longest elapsed time at which peeling could be achieved at the bonded surface without tearing the paper or the fibers of the wood material was determined as "open time (sec)".

<Constant Temperature Creep>

The hot melt adhesive melted by heating to 170° C. was coated onto a paper (Kent paper: 210 g/m²) to a thickness of 200 μm. Thereafter, the paper piece coated with the hot melt adhesive was bonded to a wood material at room temperature, and then, a 5-kg weight was placed thereon for 5 minutes, followed by cooling. The weight was removed, and the bonded test piece was left to stand in an environment at a temperature of 23° C. and a humidity of 50% for 24 hours. Then, a load of 200 g was applied to the thus prepared test piece in the stress direction in an environment at a temperature of 70° C. or 90° C. and a relative humidity of 30%, and a time until the bonded sample was peeled off was measured. The measurement was carried out 3 times, and an average of the three measurements was determined as the value of the constant temperature creep test.

INDUSTRIAL APPLICABILITY

The propylene-based polymer of the present invention can be favorably used in the field of hot melt adhesives. Further,

TABLE 4

| | | | Reference Example 6 | Example 15 | Comparative Example 5 | Comparative Example 6 | Reference Example 7 | Example 16 | Comparative Example 7 | Comparative Example 8 |
|---|---|---|---|---|---|---|---|---|---|---|
| Composition (parts by mass) | (A) | Ethylene-based1 copolymer * | — | — | 65 | — | — | — | 65 | — |
| | (B) | Polypropylene 2 | — | 65 | — | — | — | 65 | — | — |
| | | Polypropylene 3 | 65 | — | — | — | 65 | — | — | — |
| | | Propylene-based copolymer (B-Z) *6 | — | — | — | 65 | — | — | — | 65 |
| | (C) | Tackifier resin (C-2) *7 | 35 | 35 | 35 | 35 | 20 | 20 | 20 | 20 |
| | (D) | Wax (D-2) *8 | — | — | — | — | 15 | 15 | 15 | 15 |
| Open time (sec) | | | 20 | 15 | 10 | >25 | 15 | 10 | 5 | 5 |
| Constant temperature creep 70° C., 30% (min) | | | >500 | >500 | 57 | >500 | 17 | >500 | 1 | 4 |
| Constant temperature creep 90° C., 30% (min) | | | 0 | >500 | 0 | 204 | | | | |
| Melt viscosity 190° C. (mPa · s) | | | 4,220 | 3,470 | 5,620 | 3,690 | 2,930 | 2,390 | 4,350 | 2,640 |

*1: an ethylene-1-octene copolymer (trade name: Affinity GA1950, manufactured by The Dow Chemical Company)
*6: an ethylene-propylene-butene copolymer (trade name: VESTOPLAST 708, manufactured by Evonik Industries)
*7: a hydrogenated petroleum resin (trade name: I-MARV P-125, manufactured by Idemitsu Kosan Co., Ltd.)
*8: a polypropylene wax (trade name: Biscol 660-P, manufactured by Sanyo Chemical Industries, Ltd.)

Since the propylene-based polymer (B1) of the present invention to be contained as a base polymer is relatively hard, the hot melt adhesives (Examples 15 and 16) of the third embodiment of the present invention are not suitable as an adhesive for packaging, the coating amount of which in use is small, but is suitable as an adhesive for woodwork, the coating amount of which in use is large. In particular, an adhesive for woodwork to be used in a kitchen or the like is required to have durability at higher temperatures, and therefore, the hot melt adhesives of Examples 15 and 16 which have excellent constant temperature creep at 90° C. are useful as an adhesive for woodwork.

On the other hand, in the case of Comparative Example 5 in which the ethylene-based copolymer (A) is used as a base polymer and the propylene-based polymer of the present invention is not contained, since the ethylene-based copolymer (A) itself is a material having adhesiveness, very favorable results are obtained for the open time. However, the heat creep resistance is poor, and particularly the constant temperature creep at 90° C. is significantly poor. The fluidity of a low molecular weight component increases with the increase in the temperature so that the low molecular weight component is leached out and the bonding cannot be maintained. Further, in the case of Comparative Example 6 in which a propylene-based copolymer (B-Z) having a molecular weight distribution outside the scope of the present invention is used as a base polymer, the open time is long. In the case of Comparative Examples 7 and 8 in which a wax is added for adjusting the viscosity, although the open time is short, the adhesiveness is low, and therefore, the heat creep resistance is poor.

Incidentally, in the case of Reference Example 6 in which the propylene-based polymer (B2) is used as the base polymer, the constant temperature creep at 70° C. is favorable, but the constant temperature creep at 90° C. is poor. Further, in the case of Reference Example 7 in which a wax is added for adjusting the viscosity, although the open time is short, the adhesiveness is low, and therefore, the heat creep resistance is poor.

the hot melt adhesive of the present invention can be favorably used as an adhesive for packaging such as corrugated cardboards, and an adhesive for sanitary articles, woodwork, bookbinding, fibers, electrical materials, canning, building, bag making, and the like.

The invention claimed is:

1. A propylene-based polymer which satisfies the following (a1) to (d1):
   (a1) [mmmm]=60 to 80 mol %;
   (b1) weight-average molecular weight (Mw)=10,000 to 55,000;
   (c1) Mw/Mn≤2.5; and
   (d1) [rmrm]<2.5 mol %.

2. The propylene-based polymer according to claim 1, wherein the following (b1') is satisfied:
   (b1') weight-average molecular weight (Mw)=10,000 to 51,000.

3. A hot melt adhesive, comprising the propylene-based polymer (B1) according to claim 1 in an amount of 1 to 30 parts by mass with respect to 100 parts by mass of an ethylene-based polymer (A).

4. A hot melt adhesive, comprising a propylene-based polymer (B2) which satisfies the following (a2) and (b2) in an amount of 1 to 30 parts by mass with respect to 100 parts by mass of an ethylene-based polymer (A):
   (a2) [mmmm]=more than 60 mol % and 80 mol % or less; and
   (b2) weight-average molecular weight (Mw)=1,000 to 150,000.

5. The hot melt adhesive according to claim 3, wherein the ethylene-based polymer (A) is an ethylene-α-olefin copolymer.

6. The hot melt adhesive according to claim 3, wherein the ethylene-based polymer (A) is an ethylene-1-octene copolymer.

7. The hot melt adhesive according to claim 3, wherein the ethylene-based polymer (A) is an ethylene-1-octene copolymer containing 63 to 65% by mass of a structural unit derived from ethylene and 35 to 37% by mass of a structural unit derived from 1-octene.

8. The hot melt adhesive according to claim 3, further comprising a tackifier resin (C) in an amount of 50 to 200 parts by mass and a wax (D) in an amount of 50 to 200 parts by mass with respect to 100 parts by mass of the ethylene-based polymer (A).

9. A method for bonding a base material to another base material, comprising a step of melting the hot melt adhesive according to claim 3 and coating the adhesive onto at least one base material, and a step of bonding the other base material to the coated hot melt adhesive.

10. A hot melt adhesive, comprising the propylene-based polymer (B1) according to claim 2 in an amount of 1 to 30 parts by mass with respect to 100 parts by mass of an ethylene-based polymer (A).

11. The hot melt adhesive according to claim 4, wherein the ethylene-based polymer (A) is an ethylene-α-olefin copolymer.

12. The hot melt adhesive according to claim 4, wherein the ethylene-based polymer (A) is an ethylene-1-octene copolymer.

13. The hot melt adhesive according to claim 4, wherein the ethylene-based polymer (A) is an ethylene-1-octene copolymer containing 63 to 65% by mass of a structural unit derived from ethylene and 35 to 37% by mass of a structural unit derived from 1-octene.

14. The hot melt adhesive according to claim 4, further comprising a tackifier resin (C) in an amount of 50 to 200 parts by mass and a wax (D) in an amount of 50 to 200 parts by mass with respect to 100 parts by mass of the ethylene-based polymer (A).

15. A method for bonding a base material to another base material, comprising a step of melting the hot melt adhesive according to claim 4 and coating the adhesive onto at least one base material, and a step of bonding the other base material to the coated hot melt adhesive.

* * * * *